(12) United States Patent
Ishibashi et al.

(10) Patent No.: US 6,576,824 B2
(45) Date of Patent: Jun. 10, 2003

(54) TONE CONTROL PARAMETER SETTING DEVICE

(75) Inventors: Susumu Ishibashi, Hamamatsu (JP); Fumiteru Takeda, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/086,141

(22) Filed: Feb. 27, 2002

(65) Prior Publication Data

US 2002/0121179 A1 Sep. 5, 2002

(30) Foreign Application Priority Data

Mar. 2, 2001 (JP) ........................................ 2001-058046

(51) Int. Cl.[7] .............................................. G09B 15/08
(52) U.S. Cl. ........................ 84/477 R; 84/615; 84/626; 84/653; 84/662
(58) Field of Search .................. 84/600–602, 608–612, 84/615, 626–636, 649–653, 662–668, 447 R, 478

(56) References Cited

U.S. PATENT DOCUMENTS

| | | | | |
|---|---|---|---|---|
| 4,791,847 A | * | 12/1988 | Nishimoto | 84/622 |
| 5,027,690 A | * | 7/1991 | Wachi et al. | 84/626 |
| 5,496,963 A | * | 3/1996 | Ito | 84/653 |
| 5,652,402 A | * | 7/1997 | Kondo et al. | 84/653 |
| 5,710,898 A | | 1/1998 | Tozuka | |
| 5,739,453 A | * | 4/1998 | Chihana et al. | 84/615 |
| 5,969,284 A | * | 10/1999 | Yamamoto et al. | 84/622 |

* cited by examiner

Primary Examiner—Marlon T. Fletcher
(74) Attorney, Agent, or Firm—Morrison & Foerster LLP

(57) ABSTRACT

A display 21 for setting atone control parameter is disposed on an operation panel of an electronic musical instrument. Function and subfunction operator groups 23, 24 are arranged in parallel in two rows along a longer side of display 21. Function operator group 23 corresponds to each function in the first hierarchy, and subfunction operator group 24 corresponds to each subfunction in the second hierarchy that is designated for each function in the first hierarchy. Display 21 displays a tone control parameter that is to be set by the operation of a parameter setting operator group 25 and the characters representing each function and each subfunction of the function and subfunction operator groups 23, 24. By operation of each operator group 23, 24, the functions and the subfunctions are switched hierarchy by hierarchy, whereby a desired tone control parameter can be easily set to be a desired value or can be easily changed.

6 Claims, 11 Drawing Sheets

Fig.7 display example 1

Fig.14

| | | SF1 | SF2 | SF3 | SF4 | SF5 | INFO |
|---|---|---|---|---|---|---|---|
| F1 | PLAY (ordinary play mode) | × | × | × | × | × | display of basic information |
| F2 | × | × | × | × | × | × | × |
| F3 | × | × | × | × | × | × | × |
| F4 | PORTA (portamento control setting) | × | × | × | × | × | display of basic information |
| F5 | EG (envelope control setting) | × | × | × | × | × | display of basic information |
| F6 | ARP (arpeggiator setting) | × | × | × | × | × | display of basic information |

Fig.15

|    | SF1 | SF2 | SF3 | SF4 | SF5 | INFO |
|----|-----|-----|-----|-----|-----|------|
| F1 GENERAL (general item setting) | NAME (timbre name setting) | PLYMODE (play mode setting) | MEQ OFS (equalizer setting) | PORTA (portamento setting) | OTHER (other setting) | input of timbre name by character table |
| F2 OUTPUT (output process) | × | × | × | × | × | × |
| F3 ARP (arpeggiator setting) | TYPE (arpeggio pattern setting etc.) | LIMIT (arpeggio range/ loudness setting) | PLAY FX (arpeggio sound length setting) | × | (CLEAR) (clear) | input of arpeggio range by key depressing |
| F4 CTL SET (operator function setting) | SET1/2 | SET3/4 | SET5/6 | × | × | × |
| F5 LFO (setting an oscillator for modulation) | WAVE (waveform selection) | DELAY (rise delay setting) | DEST1 (modulation object setting) | DEST2 (modulation object setting) | DEST3 (modulation object setting) | × |
| F6 EFFECT (effect setting) | CONNECT (effector connection mode setting) | INS1 (selection of effector 1) | INS2 (selection of effector 2) | CHORUS (chorus setting) | REVERB (reverberation setting) | × |

TONE CONTROL PARAMETER SETTING DEVICE

BACKGROUND OF THE INVENTION

1. Field of the Invention

The present invention relates to a tone control parameter setting device applied to an apparatus that generates a tone signal, such as an electronic musical instrument, for setting a tone control parameter that controls a mode of generating the tone signal.

2. Description of the Background Art

From the past, a tone control parameter setting device is known which is provided with a rectangular displayer capable of displaying characters and numerals, a plurality of function operators arranged in one row along one side of the displayer, and a parameter setting operator for setting a tone control parameter that controls a mode of generating a tone signal, on an operation panel of an electronic musical instrument. In this device, first, when any one of the plurality of function operators is operated, one function designated by the operated function operator among a plurality of functions belonging to a first hierarchy is designated. Next, when any one of the aforesaid plurality of function operators is operated again, one subfunction designated by the operated function operator among a plurality of subfunctions belonging to the aforesaid designated one function and belonging to a second hierarchy is designated.

By designation of this subfunction, the displayer displays a setting screen which corresponds to the designated subfunction and which is used for setting the tone control parameter that is designated by the subfunction and controls the mode of generating the tone signal. When the parameter setting operator is operated in this state, the tone control parameter designated by the setting screen displayed on the displayer is set in accordance with the operated parameter setting operator.

However, in the above-described conventional device, the designation of the functions in the first hierarchy and the designation of the subfunctions in the second hierarchy are carried out using the same function operators, making it difficult to grasp the hierarchies at the time of operating the function operators. Further, an operator to return from the second hierarchy to the first hierarchy needs to be provided, and also an operation to return from the second hierarchy to the first hierarchy needs to be carried out. For these reasons, designation of a desired hierarchy, function, and subfunction cannot be easily carried out, and there are cases in which the desired tone control parameter cannot be easily set to be a desired value or cannot be easily changed.

SUMMARY OF THE INVENTION

The present invention has been made in order to solve the aforementioned problems of the prior art, and an object thereof is to provide a tone control parameter setting device in which a desired tone control parameter can be easily set to be a desired value or can be easily changed.

In order to achieve the aforesaid object, a characteristic constructional feature of the present invention lies in that a tone control parameter setting device includes a displayer capable of displaying characters and numerals; a plurality of first function operators arranged in one row near the displayer for respectively designating a different function; a plurality of second function operators arranged in one row in parallel with the first function operators for respectively designating a different subfunction belonging to each of the functions designated by each of the first function operators; a parameter setting operator for setting a tone control parameter that controls a mode of generating a tone signal; a display controller for allowing the displayer to display a setting screen which corresponds to a subfunction designated by the second function operators among a plurality of subfunctions belonging to the function designated by the first function operators, wherein the setting screen is used for setting the tone control parameter that is designated by the subfunction to control the mode of generating the tone signal; and a parameter setting circuit for setting the tone control parameter, which is designated by the setting screen displayed on the displayer, in accordance with an operation of the parameter setting operator.

In this case, the display controller allows the displayer to display, for example, the tone control parameter, the functions that are allotted to the plurality of first function operators, and the subfunctions that are allotted to the plurality of second function operators, on the setting screen for setting the tone control parameter. The functions and subfunctions are displayed in the setting screen at positions corresponding to the plurality of first and second function operators respectively.

In the present invention constructed as described above, when any one of the plurality of fist function operators is operated, one function corresponding to the operated first function operator among the plurality of functions, in other words, one function among the plurality of functions belonging to the first hierarchy, is designated. Next, when any one of the plurality of second function operators is operated, one subfunction corresponding to the operated second function operator among the plurality of subfunctions belonging to the designated function of the first hierarchy, in other words, one subfunction among the plurality of subfunctions belonging to the second hierarchy, is designated. The display controller then allows the displayer to display a setting screen which corresponds to the designated subfunction and which is used for setting the tone control parameter for controlling the mode of generating the tone signal, and the parameter setting circuit sets the tone control parameter designated by the setting screen displayed on the displayer in accordance with the operation of the parameter setting operator.

As a result of this, according to the present invention, the functions belonging to the first hierarchy and the subfunctions belonging to the second hierarchy are respectively designated by the operation of the first function operators and the second function operators that are independently arranged, thereby eliminating the need for grasping the hierarchy at the time of operating the function operators as in the above-described prior art. In other words, when the first function operators are operated, the functions belonging to the first hierarchy are designated, while when the second function operators are operated, the subfunctions belonging to the second hierarchy are designated. As a result of this, the present invention eliminates the need for an operation to move from one hierarchy to another hierarchy, whereby the designation of a desired function and subfunction can be easily carried out, and a desired tone control parameter can be easily set to have a desired value or can be easily changed. Further, in the case where the displayer has a rectangular shape with longitudinal and lateral lengths that are different from each other (many of the currently easily available liquid crystal displayers have longitudinal and lateral lengths that are different from each other), numerous first and second function operators can be advantageously arranged if the first and second function operators are arranged along the longer side among the longitudinal and lateral sides.

Another characteristic constructional feature of the present invention lies in that the display controller is constructed to include a variable storing memory for storing a first variable representing anyone function among the plurality of functions designated by the plurality of first function operators and a plurality of second variables respectively representing any one subfunction among the plurality of subfunctions designated by the plurality of second function operators for each function designated by the first variable; a first renewing circuit for renewing the first variable when any one of the plurality of first function operators is operated, to a value representing the function designated by the first function operator that is operated; and a second renewing circuit for renewing a second variable representing any one subfunction among the plurality of subfunctions belonging to the function designated by the first variable when any one of the plurality of second function operators is operated, to a value representing the subfunction designated by the second function operator that is operated, and that the display controller allows the displayer to display a setting screen corresponding to the subfunction designated by the second variable among the plurality of subfunctions belonging to the function designated by the first variable.

This allows that, even if any one of the plurality of second function operators is operated, the second variables each representing one subfunction among the plurality of subfunctions belonging to the functions that are not designated by the first variable are maintained at the previous values. Therefore, when a first function operator different from the previous one among the plurality of first function operators is newly operated, a setting screen for setting the tone control parameter is determined by the first variable representing the function designated by the newly operated first function operator and by the second variable previously set and representing one subfunction among the plurality of subfunctions belonging to the designated function. As a result of this, the operation of moving from a subfunction belonging to one function to a desired subfunction belonging to another function can be easily carried out, whereby a desired tone control parameter can be set more easily.

BRIEF DESCRIPTION OF THE DRAWINGS

FIG. 14 is a view for describing an allotment of functions to function operators and subfunction operators in the timbre selecting mode; and FIG. 15 is a view for describing an allotment of functions to function operators and subfunction operators in the timbre editing mode.

DESCRIPTION OF THE PREFERRED EMBODIMENTS

Figure 1:
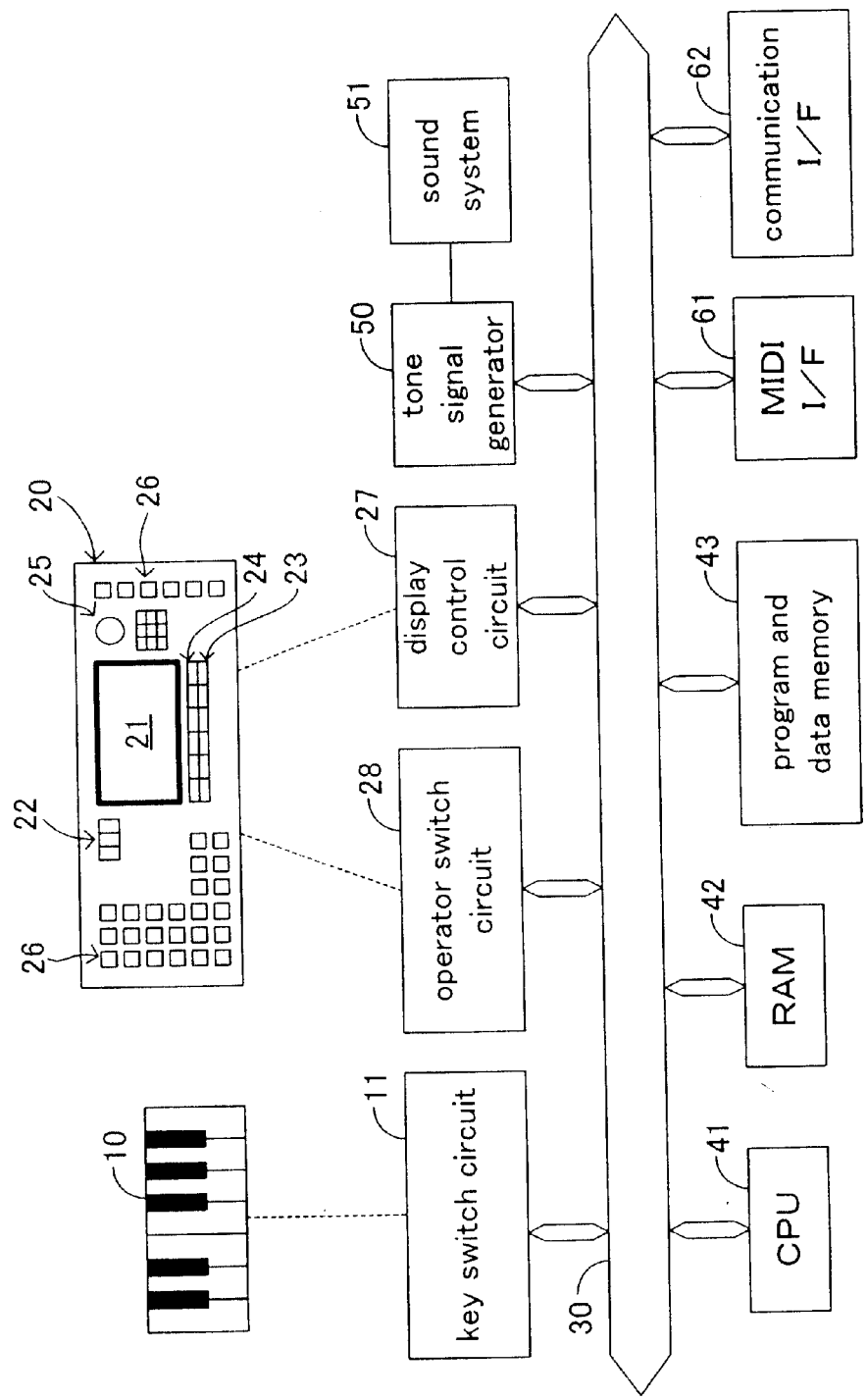
FIG. 1 is a schematic block diagram illustrating an electronic musical instrument according to one embodiment of the present invention.

Hereafter, one embodiment of the present invention will be described with reference to the attached drawings. FIG. 1 is a block diagram illustrating an electronic musical instrument to which a tone control parameter setting device of the present invention is applied.

This electronic musical instrument includes a keyboard 10 and an operation panel 20. Keyboard 10 is made of a plurality of keys functioning as a play operator. The depressing/releasing of each key is detected by a key switch disposed in correspondence with each key in a key switch circuit 11.

A display 21, a mode operator group 22, a function operator group 23, a subfunction operator group 24, a parameter setting operator group 25, and another control operator group 26 are arranged on the operation panel 20. Display 21 is constituted with a liquid crystal displayer having a rectangular shape with longer lateral sides, and is capable of displaying various images such as characters, numerals, and images. Here, a different displayer such as a small cathode-ray tube device other than a liquid crystal displayer may be employed as this display 21. Display 21 is controlled by a display control circuit 27.

Figure 7:
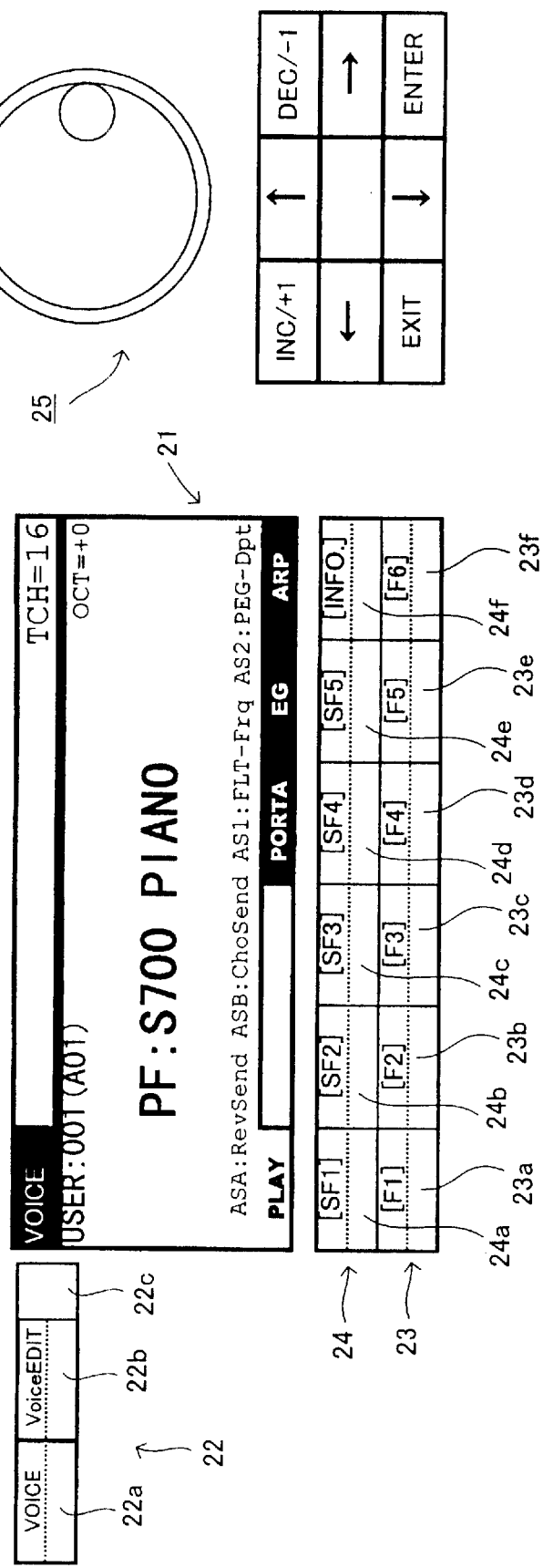
FIG. 7 is a view illustrating a screen for setting an ordinary play mode at the time of timbre selection and arrangement of various operators.

The mode operator group 22 is arranged on one side of an upper part of display 21, and is made of first to third mode operators 22a to 22c for respectively selecting a timbre selecting mode, a timbre editing mode, and other modes, as illustrated in FIG. 1 and in an enlarged view of FIG. 7. Function operator group 23 is arranged in one row in a lateral direction near the lower part of display 21, and is made of first to sixth function operators 23a to 23f for respectively selecting a plurality of functions displayed along the lateral direction in the lower part of display 21. Subfunction operator group 24 is arranged in one row between display 21 and function operator group 23 in parallel with the operator group 23, and is made of first to fifth function operators 24a to 24e for respectively selecting a plurality of subfunctions displayed along the lateral direction in the lower part of display 21 and an information operator 24f.

Parameter setting operator group 25 is arranged on one side of display 21, and is made of a plurality of operators such as a rotary operator, an increment operator, a decrement operator, cursor movement operators, and an enter operator for setting the tone control parameter that controls the mode of generating tone signals. The other control operator group 26 is made of a plurality of operators for controlling the other operations such as automatic play and automatic rhythm. Operation of the operators in these operator groups, i.e. mode operator group 22, function operator group 23, subfunction operator group 24, parameter setting operator group 25, and the other control operator group 26, is detected by operator switches disposed in an operator switch circuit 28 in respective correspondence with the operators.

Figure 2:
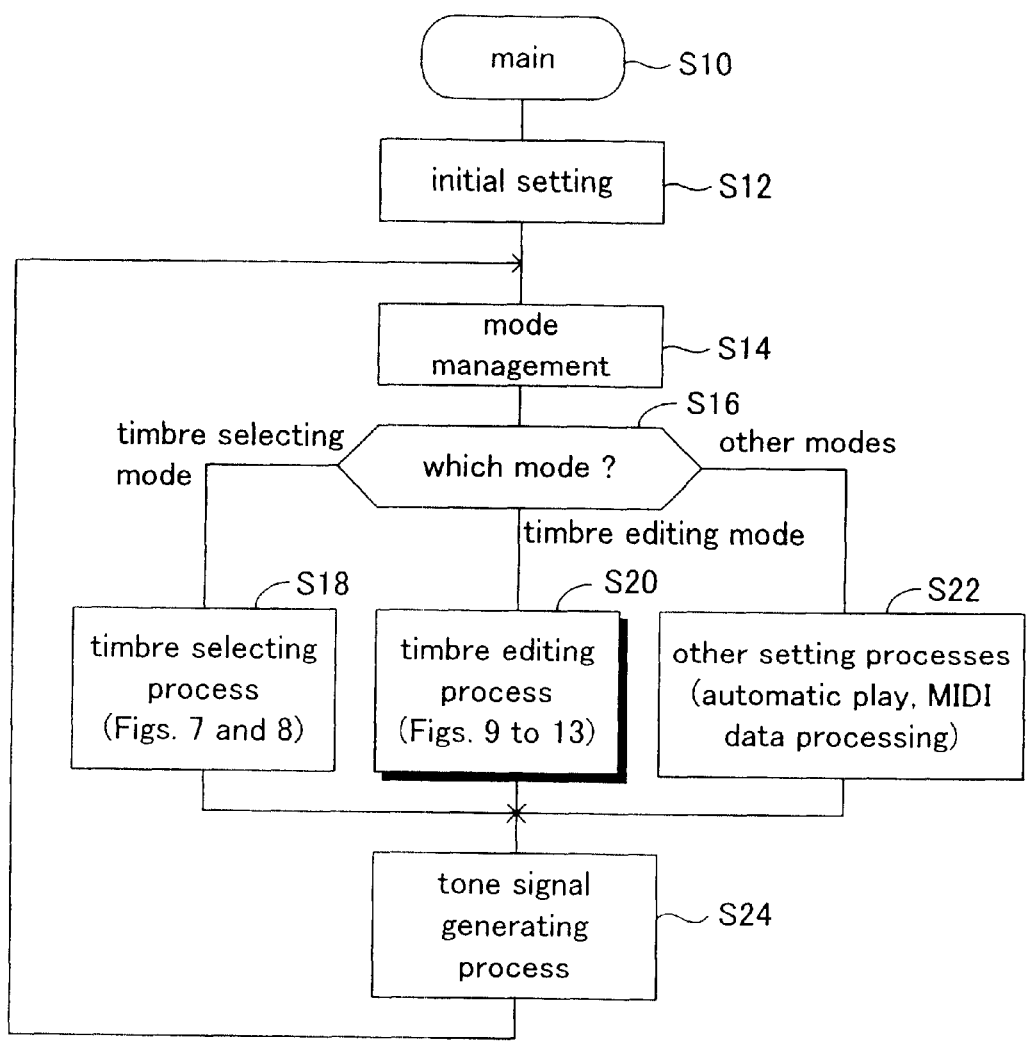
FIG. 2 is a flow chart showing a main program executed by the CPU of FIG. 1.

These circuits, i.e. key switch circuit 11, display control circuit 27, and operator switch circuit 28, are connected to a bus 30. A CPU 41, a RAM 42, a program and data memory 43, and a tone signal generator 50 are connected to bus 30. CPU 41 controls various operations of the electronic musical instrument by executing the main program of FIG. 2 and other programs. RAM 42 temporarily stores variables needed for the execution of the aforesaid various programs.

Program and data memory 43 includes various recording media such as a ROM and a hard disk HD that are incorporated in advance in this electronic musical instrument, and a compact disk CD, a mini disk MD, and a flexible disk FD that can be mounted onto the electronic musical instrument, as well as a drive unit for these recording media. Program and data memory 43 stores various programs and various data. In particular, these various data include various tone control parameters for controlling the mode of generating the tone signals and display control data for displaying the screen for setting the tone control parameters on display 21. Further, various programs and data can also be supplied to these recording media from the outside via a MIDI interface circuit 61 or a communication interface circuit 62 which will be mentioned later.

Tone signal generator 50 forms tone signals on the basis of play information (key-on signal, key-off signal, note number, velocity, and others) from CPU 41. In forming the tone signals, the tone control parameters supplied from CPU 41 to tone signal generator 50 control the mode of generating the tone signals, including the tone signal elements such as a timbre, loudness (amplitude envelope), and effect of the tone signals. The tone signals formed in tone signal generator 50 are output to a sound system 51. Sound system 51 is made of an amplifier, a speaker, and others, and generates music sounds corresponding to the aforesaid output tone signals.

Further, a MIDI interface circuit 61 and a communication interface circuit 62 are also connected to bus 30. MIDI interface circuit 61 serves to communicate various programs and data with other electronic musical instruments or music apparatus such as a personal computer. Communication interface circuit 62 can be connected to the outside via a communication network, whereby this electronic musical instrument can communicate various programs and data with the outside.

Next, an operation of the embodiment constructed as shown above will be described. When a power switch (not illustrated) is turned on, CPU 41 starts to execute the main program of FIG. 2 at step S10 and, after the initial setting process of step S12, a circulation process made of steps S14 to S24 is repeatedly executed. In this circulation process, each operation event of the first to third mode operators 22a to 22c constituting the mode operator group 22 is detected in the mode management process of step S14, whereby the electronic musical instrument is set to any one mode among the timbre selecting mode, the timbre editing mode, and other setting modes in accordance with the operation of the first to third mode operators 22a to 22c.

When the electronic musical instrument is set to the timbre selecting mode by the aforesaid mode management of step S14, the program is allowed to proceed to the timbre selecting process of step S18 by the determining process of step S16. In this timbre selecting process, various functions related to timbre selection are allotted, as illustrated in FIG. 14, to the function operator group 23 and the subfunction operator group 24. The symbol "X" in FIG. 14 represents no allotment of functions to the function operator. In other words, in this timbre selecting mode, functions of ordinary play mode, portamento control setting, envelope control setting, and arpeggiator setting are respectively allotted to the first and fourth to sixth function operators 23a, 23d to 23f constituting the function operator group 23. In the subfunction operator group 24, a function of displaying basic information related to the aforesaid various functions is allotted to the information operator 24f alone as a subfunction.

Further, in this timbre selection process, when any of the first and fourth to sixth function operators 23a, 23d to 23f is operated, the data setting screen corresponding to the function allotted to the operated function operator is displayed on display 21. Also, various function names allotted to the first and fourth to sixth function operators 23a, 23d to 23f are displayed in the lower part of display 21 at positions corresponding to the first and fourth to sixth function operators 23a, 23d to 23f. FIG. 7 shows a state in which the first function operator 23a has been operated to indicate the ordinary play mode allotted to the operator 23a. In this state, a selected timbre name (for example, PF:S700 PIANO) is displayed at the center of display 21. Further, in the display of function names in the lower part of display 21, the selected function name is displayed in a different color from the other function names.

By operating the parameter setting operator group 25 in this state, the control data related to various functions displayed on display 21 are set and changed. For example, by moving a cursor to the timbre name display position by operation of the cursor operator and by rotation operation of the rotary operator in the displaying state of FIG. 7, the timbre names displayed on the screen are successively changed. Then, by operating the enter operator or the like, the tone control parameter related to the aforesaid timbre name being displayed is output to tone signal generator 50, so as to control the timbre of the tone signals formed in accordance with the playing of keyboard 10 in tone signal generator 50.

Figure 8:
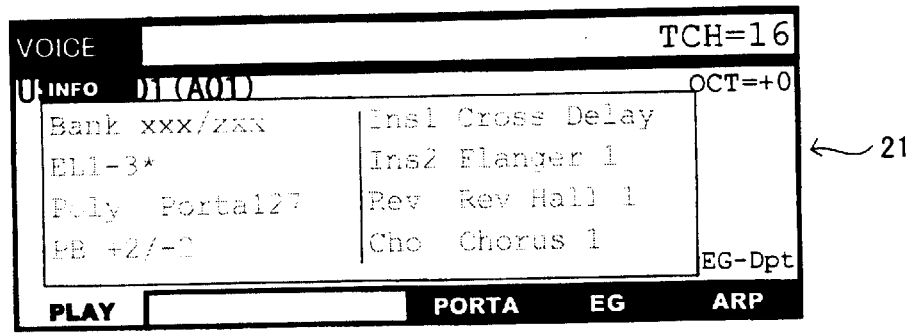
FIG. 8 is a view illustrating a display screen of basic information in the aforesaid ordinary play mode.

Further, in this timbre selection process, basic information related to various functions of ordinary play mode, portamento control setting, envelope control setting, and arpeggiator setting is displayed on display 21. For example, if the information operator 24f is operated when the displaying screen of display 21 is in a state shown in FIG. 7, the displaying screen is switched as illustrated in FIG. 8. On this displaying screen, the storing position (Bank) of the tone control parameter, the effect (Cross Delay, Flanger) imparted to the tone signals, and others are displayed.

When the electronic musical instrument is set to the timbre editing mode by the aforesaid mode management of step S14, the program is allowed to proceed to a timbre editing process routine of step S20 by the determining process of step S16 In this timbre editing process routine, the control parameter of the timbre selected by the aforesaid timbre selecting process routine of step S18 is set and changed; however, this process routine will be described in detail later.

Still further, when the electronic musical instrument is set to the other setting modes by the aforesaid mode management of step S14, the program is allowed to proceed to the other setting processes of step S22 by the determining process of step S16. In the other setting processes of this step S22, the other data setting processes such as the processing of data related to automatic play, MIDI data, or the like are carried out.

After the processes of these steps S18 to S22, the tone signal generating process is executed in step S24. In this tone signal generating process, key playing such as depressing and releasing of keys in keyboard 10 is detected, and the play information such as the key-on signal, key-off signal, note number, and velocity related to the key playing is output to bus 30 via tone signal generator 50. Tone signal generator 50 forms tone signals in accordance with this play information, or ends the formation of the tone signals that are now being generated. In forming the tone signals, the tone control parameter supplied to tone signal generator 50 by the aforesaid timbre selecting process of step S18 is used, and the timbre of the formed tone signals will be a timbre selected by the timbre selecting process of step S18. The formed tone signals are then output via a sound system 51.

Next, the timbre editing process routine of step S20 will be described in detail. In this timbre editing process routine, various functions and subfunctions for setting the tone control parameter that controls the tone elements of the tone signals such as the timbre, loudness, and effect are allotted to function operator group 23 and subfunction operator group 24, as illustrated in FIG. 15. In this case as well, the symbol "X" in FIG. 15 represents no allotment of functions to the function operator. In other words, in this timbre editing mode, functions of general item setting (GENERAL), output processing (OUTPUT), arpeggiator setting (ARP), operator function setting (CLT SET), setting an oscillator for modulation (LFO), and effect setting (EFFECT) are respectively allotted to the first to sixth function operators 23a to 23f constituting the function operator group 23.

Further, subfunctions are respectively allotted to the first to fifth subfunction operators 24a to 24e and information operator 24f for each of the aforesaid functions. For example, if the function is the general item setting, subfunctions made of timbre name setting (NAME), play mode setting (PLY MODE), equalizer setting (MEQ OFS), portamento setting (PORTA), and other setting (OTHER) are allotted to the first to fifth subfunction operators 24a to 24e. Here, the equalizer setting is for setting the frequency characteristics (cut-off frequency, frequency range, Q value of resonance etc.) of the tone signals.

Further, if the function is an arpeggiator setting, subfunctions of arpeggio pattern setting (TYPE), arpeggio range/loudness setting (LIMIT), arpeggio tone length (PLAY FX), and clearing (CLEAR) are allotted to the first to third and fifth subfunction operators 24a to 24c, 24e. A subfunction of carrying out a depress-key input of an arpeggio range using keyboard 20 is allotted to the information operator 24f. Here, the arpeggio pattern setting means setting a pattern type of arpeggio sounds generated on the basis of playing keys. The arpeggio range setting means setting the range of playing keys in which the arpeggio sounds are generated. The arpeggio loudness setting means setting the magnitude or range of the loudness of the generated arpeggio sounds. The arpeggio tone length setting means setting the note length of each arpeggio tone.

Figure 3:
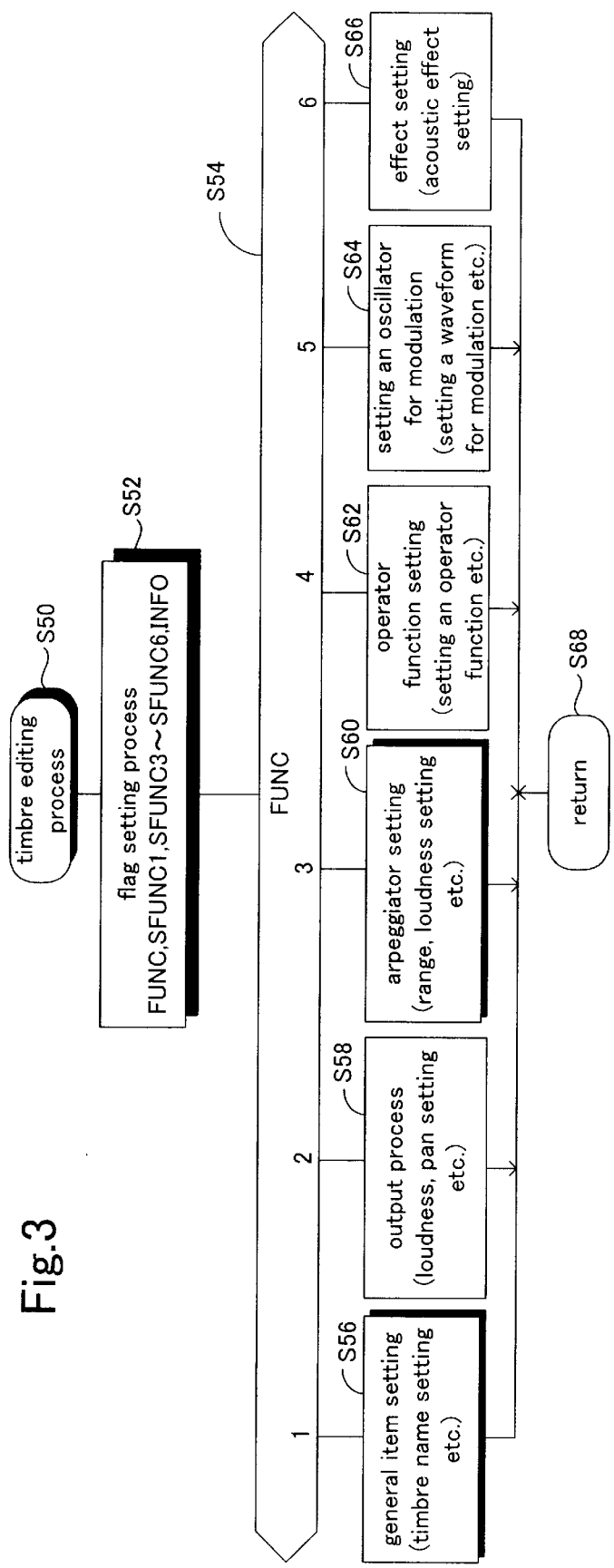
FIG. 3 is a flow chart showing a timbre editing process routine of FIG. 2 in detail.
Figure 4:
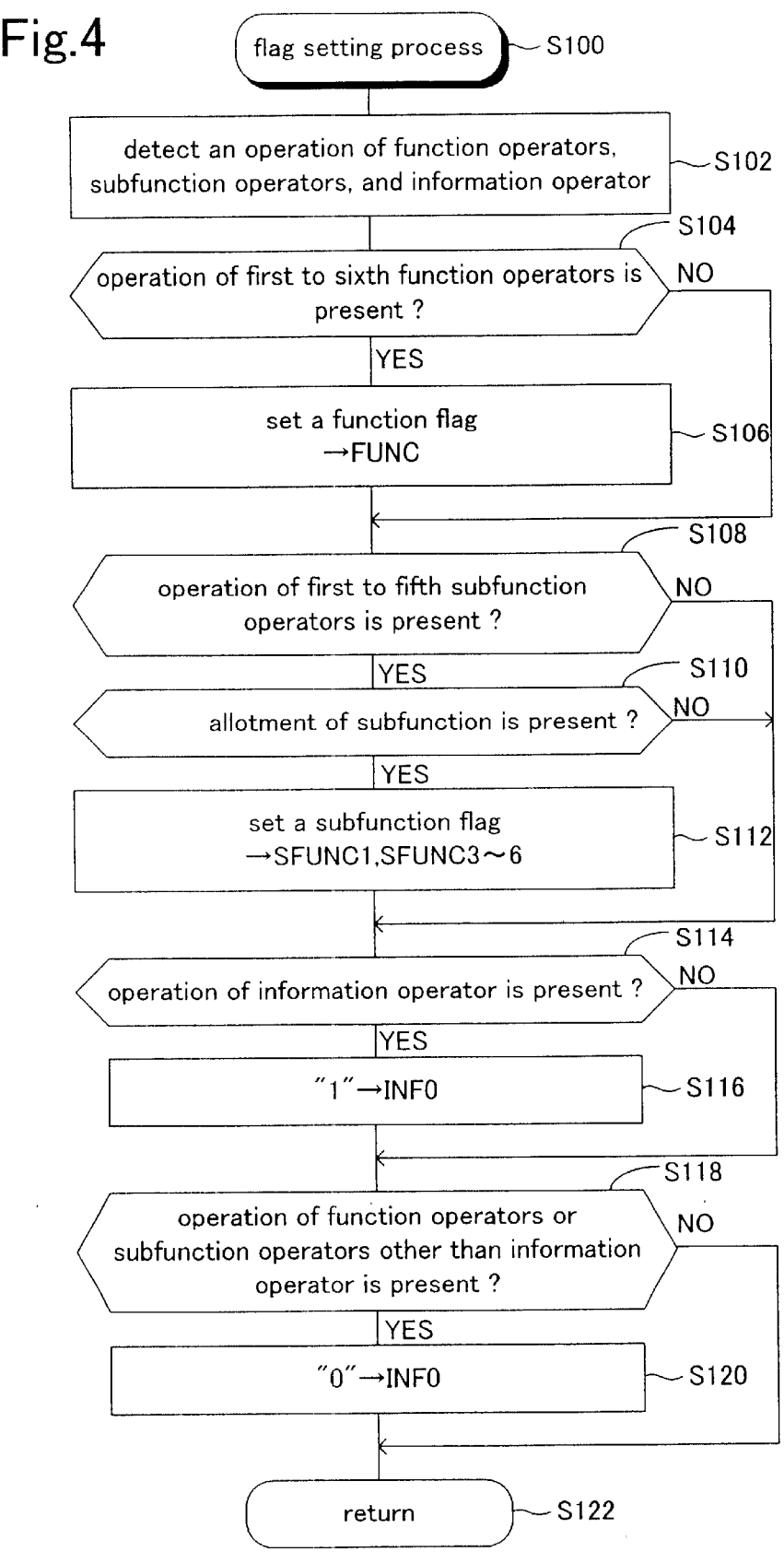
FIG. 4 is a flow chart showing a flag setting process routine of FIG. 3 in detail.

The aforesaid timbre editing process routine of step S20 is described in detail in FIG. 3. The execution of the routine is started in step S50, and the flag setting process routine is executed in step S52. This flag setting process routine is made of steps S100 to S122, as illustrated in FIG. 4. After the execution of step S100 is started, operation of the first to sixth function operators 23a to 23f, the first to fifth subfunction operators 24a to 24e, and the information operator 24f is detected in step S102. Further, in accordance with this detection of operation, various flags FUNC, SFUNC1, SFUNC3 to SFUNC6, INFO stored in RAM 42 are set to have various values by the processes of steps S104 to S120.

Here, the function flag FUNC represents the aforesaid functions of general item setting (GENERAL), output processing (OUTPUT), arpeggiator setting (ARP), operator function setting (CLT SET), setting an oscillator for modulation (LFO), and effect setting (EFFECT) of FIG. 15 by the numerals "1" to "6". The subfunction flags SFUNC1, SFUNC3 to SFUNC6 represent subfunctions respectively belonging to the aforesaid functions excluding the output processing, i.e. general item setting, arpeggiator setting, operator function setting, setting an oscillator for modulation, and effect setting. For example, the subfunction flag SFUNC1 represents the subfunctions of timbre name setting (NAME), play mode setting (PLYMODE), equalizer setting (MEQOFS), portamento setting (PORTA), and other setting (OTHER) by the numerals "1" to "5". Further, the subfunction flag SFUNC3 represents the subfunctions of arpeggio pattern setting (TYPE), arpeggio range/loudness setting (LIMIT), arpeggio tone length setting (PLAY FX), clearing (CLEAR) by the numerals "1" to "3" and "5". The information flag INFO represents the subfunctions of input of timbre name by character table and depress-key input of arpeggio range in the aforesaid general item setting and the arpeggiator setting by the numeral "1".

First, description will be given on a case in which the first to sixth function operators 23a to 23f have been operated. When any one operator among the first to sixth function operators 23a to 23f is operated, CPU 41 determines as "YES" in step S104, and sets the function flag FUNC to have a value (any one value of "1" to "6") representing the function corresponding to the operated operator in step S106. Here, this function flag FUNC is initially set to have a value of "1".

When any one operator among the first to fifth subfunction operators 24a to 24d is operated, CPU 41 determines as "YES" in step S108, and determines whether a subfunction is allotted to the operated operator in step S110. Then, only in the case where a subfunction is allotted to the operated operator, CPU 41 determines as "YES" in step S110, and sets the subfunction flag SFUNCn (n=1, 3 to 6) designated by the function flag FUNC (any integer n of 1, 3 to 6) among the subfunction flags SFUNC1, SFUNC3 to SFUNC 6, to have the value (any one value of "1" to "5") representing the subfunction corresponding to the operated operator in step S112. Now, it is to be noted that the subfunction flags SFUNCm (m≠n) that are not designated by the function flag FUNC among the subfunction flags SFUNC1, SFUNC3 to SFUNC6 are maintained at the previously set values. Here, these subfunction flags SFUNC1, SFUNC3 to SFUNC 6 are also initially set to have a value of "1".

When the information operator 24f is operated, CPU 41 determines as "YES" in step S114 and sets the information flag INFO to "1" in step S116. Further, this information flag INFO set to be "1" is reset to "0" by the processes of steps S118, S120 when any one of the first to sixth function operators 23a to 23f and the first to fifth subfunction operators 24a to 24e is operated. Here, this information flag INFO is initially set to "0".

Returning to the description of the timbre editing process routine of FIG. 3 again, after the aforesaid process of step S52, CPU 41 determines in step S54 which value of "1" to "6" the function flag FUNC has. By this determining process of step S54, the processes of general item setting, output processing, arpeggiator setting, operator function setting, setting an oscillator for modulation, effect setting, and others are executed in steps S56 to S66 in accordance with the values "1" to "6" to which the function flag FUNC is set, and then ends the timbre editing process in step S68.

In these processes of steps S56 to S66, by collaboration with the display control circuit 27, CPU 41 allows display 21 to display a setting screen corresponding to the subfunction belonging to the function designated by the function flag FUNC and designated by the subfunction flags SFUNC1, SFUNC3 to SFUNC 6. This setting screen includes display of the tone control parameter related to the subfunction designated by the aforesaid function flag FUNC and subfunction flags SFUNC1, SFUNC3 to SFUNC6, and display of the characters (GENERAL, OUTPUT, ARP . . . , NAME, PLYMODE, MEQ OFS . . . , LIST) representing the functions and subfunctions allotted to the operators in correspondence with the first to sixth function operators 23a to 23f, first to fifth subfunction operators 24a to 24e, and information operator 24f (FIGS. 9 to 13). In this case also, in the aforesaid display of function names in the lower part of display 21, the selected function name and subfunction name are displayed in different colors from the other function names and subfunction names.

By operating the parameter setting operator group 25 in this displaying state, the tone control parameters related to the various functions displayed on display 21 are set and changed. In other words, the tone control parameters stored in the recording medium such as the hard disk in the program and data memory 43 and related to the subfunctions designated by the function flag FUNC and the subfunction flags SFUNC1, SFUNC3 to SFUNC6 are set and changed by the operation of the parameter setting operator group 25.

Specifically, if the function flag FUNC is set to be "1", a process of displaying a setting screen regarding the general item such as the timbre name, play mode, or frequency characteristics by an equalizer and a process of setting the tone control parameters are carried out for one type of tone signal (for example, tone signal of the timbre of number S700 of piano PF) formed in tone signal generator 50 in accordance with the value (1 to 5) of the subfunction flag SFUNC1 and the information flag INFO in step S56.

If the function flag FUNC is set to be "2", a process of displaying a setting screen regarding the output processing such as loudness and pan and a process of setting the tone control parameters are carried out for one type of tone signal formed in tone signal generator 50 in step S58.

If the function flag FUNC is set to be "3", a process of displaying a setting screen regarding the arpeggiator setting such as arpeggio pattern, arpeggio range, and loudness and a process of setting the tone control parameters are carried out for one type of tone signal formed in tone signal generator 50 in accordance with the value (1 to 3, 5) of the subfunction flag SFUNC3 and the information flag INFO in step S60.

If the function flag FUNC is set to be "4", a process of displaying a setting screen regarding the allotment of functions to the various operators and a process of setting the data are carried out in accordance with the value (1 to 3) of the subfunction flag SFUNC4 in step S62.

If the function flag FUNC is set to be "5", a process of displaying a setting screen regarding a signal for modulation such as selection of a modulation signal waveform used in the modulation effect imparted to the tone signal, setting the rising delay characteristics of the modulation signal, and setting the tone element to be modulated (pitch, timbre, loudness) and a process of setting the tone control parameters are carried out for one type of tone signal formed in tone signal generator 50 in accordance with the value (1 to 5) of the subfunction flag SFUNC5 in step S64.

If the function flag FUNC is set to be "6", a process of displaying a setting screen regarding an acoustic effect such as a chorus or reverberation imparted to the tone signal and a process of setting the tone control parameters are carried out for one type of tone signal formed in tone signal generator 50 in accordance with the value (1 to 5) of the subfunction flag SFUNC6 in step S66.

The details of the displaying and setting processes of these steps S56 to S66 will be described hereafter by raising each process routine of general item setting in step S56 and arpeggiator setting in step S60 as an example.

Figure 5:
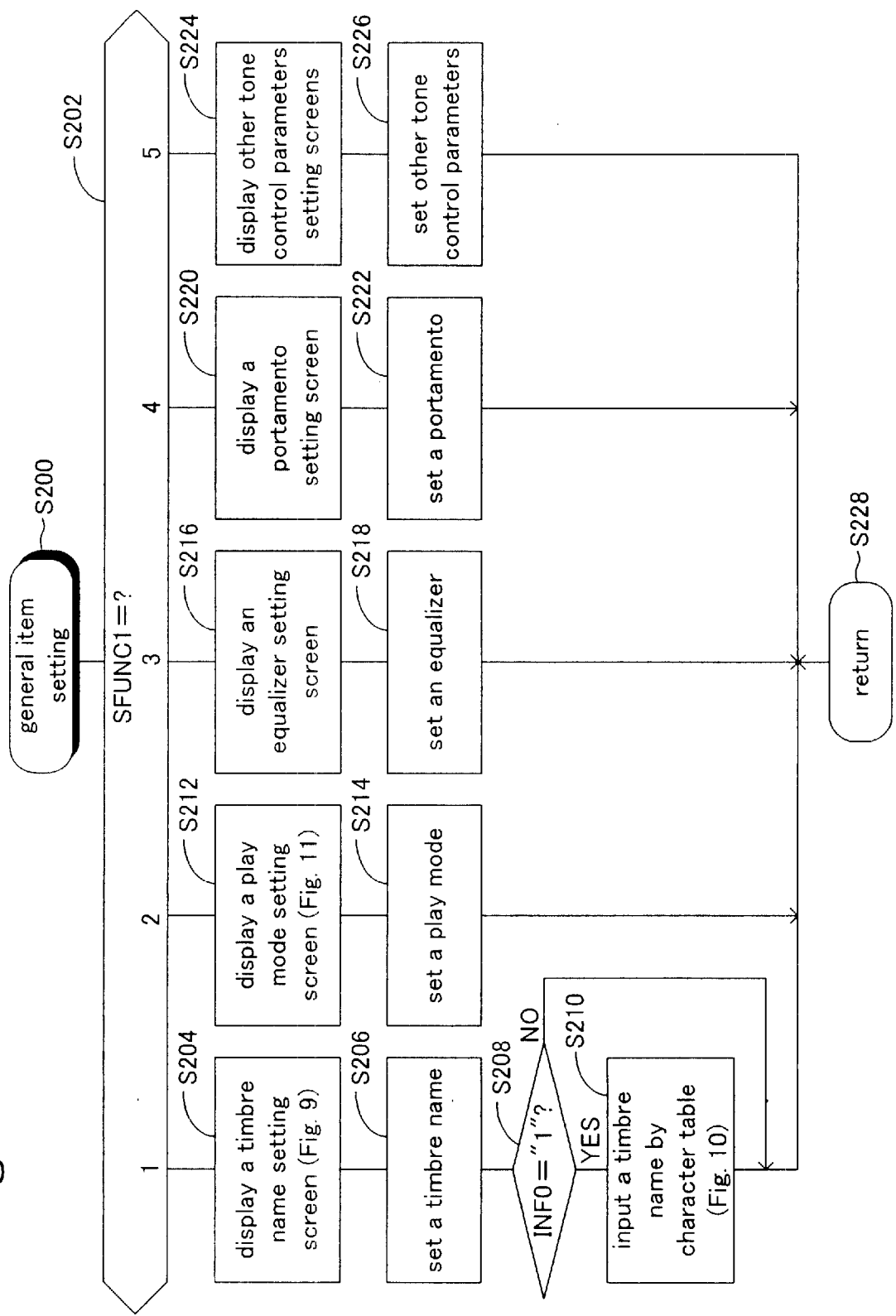
FIG. 5 is a flow chart showing a general item setting routine of FIG. 3 in detail.
Figure 9:
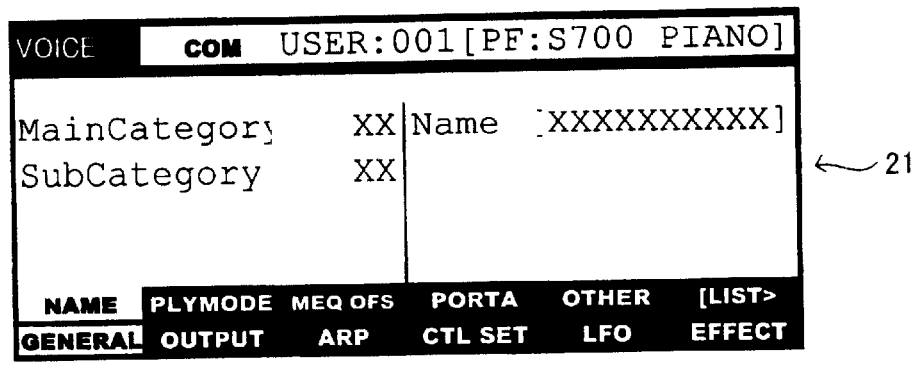
FIG. 9 is a view illustrating a display screen for setting a timbre name at the time of general item setting.

As illustrated in detail in FIG. 5, the general item setting routine is started in step S200, and executes a branching process in accordance with the subfunction flag SFUNC1 in step S202. If the subfunction flag SFUNC1 is "1", the program is allowed to proceed to step S204 by the branching process of step S202. In step S204, by collaboration with display control circuit 27, CPU 41 displays a screen for setting a timbre name on display 21. Referring to FIG. 9, this screen is for newly setting or changing the main category, sub category, and name as a timbre name.

When the parameter setting operator group 25 is operated in this displaying state, the main category, sub category, and name displayed on display 21 are newly set or changed by the timbre name setting process of step S206. For example, by moving the cursor to the displaying positions of the main category, sub category, and name by operation of the cursor operator and by rotation operation of the rotary operator in the displaying state of FIG. 9, the main category, sub category, and name displayed on the displaying screen are changed. Then, by operating the enter operator or the like, the main category, sub category, and name displayed on the displaying screen are decided, and the data representing the aforesaid main category, sub category, and name are stored newly or stored in place of the previously stored data, as a part of the tone control parameter of one type of tone signal in the recording medium such as the hard disk in the program and data memory 43.

Figure 10:
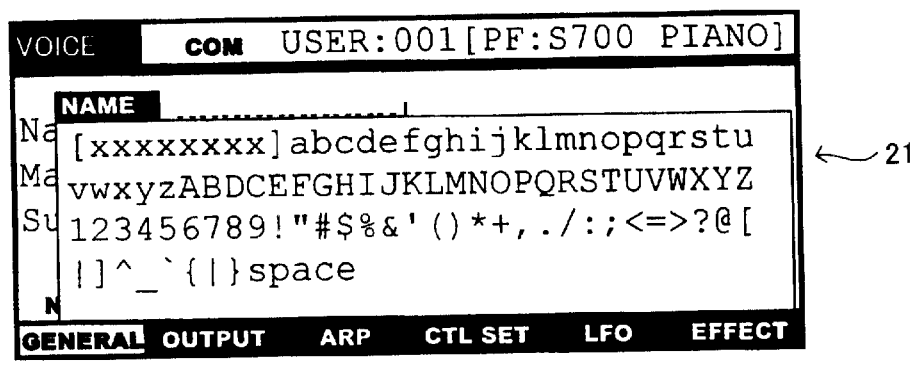
FIG. 10 is a view illustrating a display screen for character table input at the time of general item setting.
Figure 11:
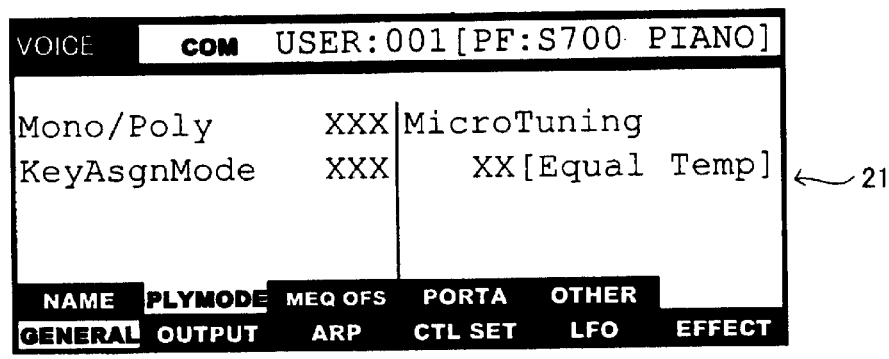
FIG. 11 is a view illustrating a display screen for setting a play mode at the time of general item setting.

Further, when the information flag INFO is set to be "1" in this state of displaying the timbre name, the process of determining as "YES" in step S208 leads to execution of a process of step S210 for inputting a timbre name by character table. In this case, display 21 is controlled to display a list of the characters, numerals, and symbols, as illustrated in FIG. 10. When the user then designates a character, numeral, or symbol by operation of the cursor movement operator, enter operator, or the like in this displaying state, the designated character, numeral, or symbol is input. This enables use of an arbitrary character, numeral, or symbol for setting the timbre name.

Further, if the subfunction flag SFUNC1 is "2", the program is allowed to proceed to steps S212, S214 by the branching process of step S202. In step S212, by collaboration with display control circuit 27, CPU 41 displays a play mode setting screen for setting a play mode (mode of generating the tone signal) such as monophonic generation/polyphonic generation (Mono/Poly) (See FIG. 11). Then, by operating the parameter setting operator group 25 in this displaying state, the play mode and others displayed on display 21 are set or changed by the play mode setting process of step S214. In other words, the data representing the aforesaid play mode are stored newly or stored in place of the previously stored data, as a part of the tone control parameter of one type of tone signal (timbre of PF:S700 PIANO in the example of FIG. 11).

Further, if the subfunction flag SFUNC1 is "3" to "5", by the branching process of step S202, CPU 41 allows display 21 to display the screens for equalizer setting, portamento setting, and other tone control parameters setting by collaboration with display control circuit 27 respectively in steps S216, S220, S224. Next, the tone control parameters related to the equalizer, portamento, and other tone control parameters are set or changed in response to an operation of the parameter setting operator group 25 by the processes of steps S218, S222, S226. Then, after the aforesaid processes of steps S208 (or S210), S214, S218, S222, S226, the execution of this general item setting routine is ended in step S228.

Figure 6:
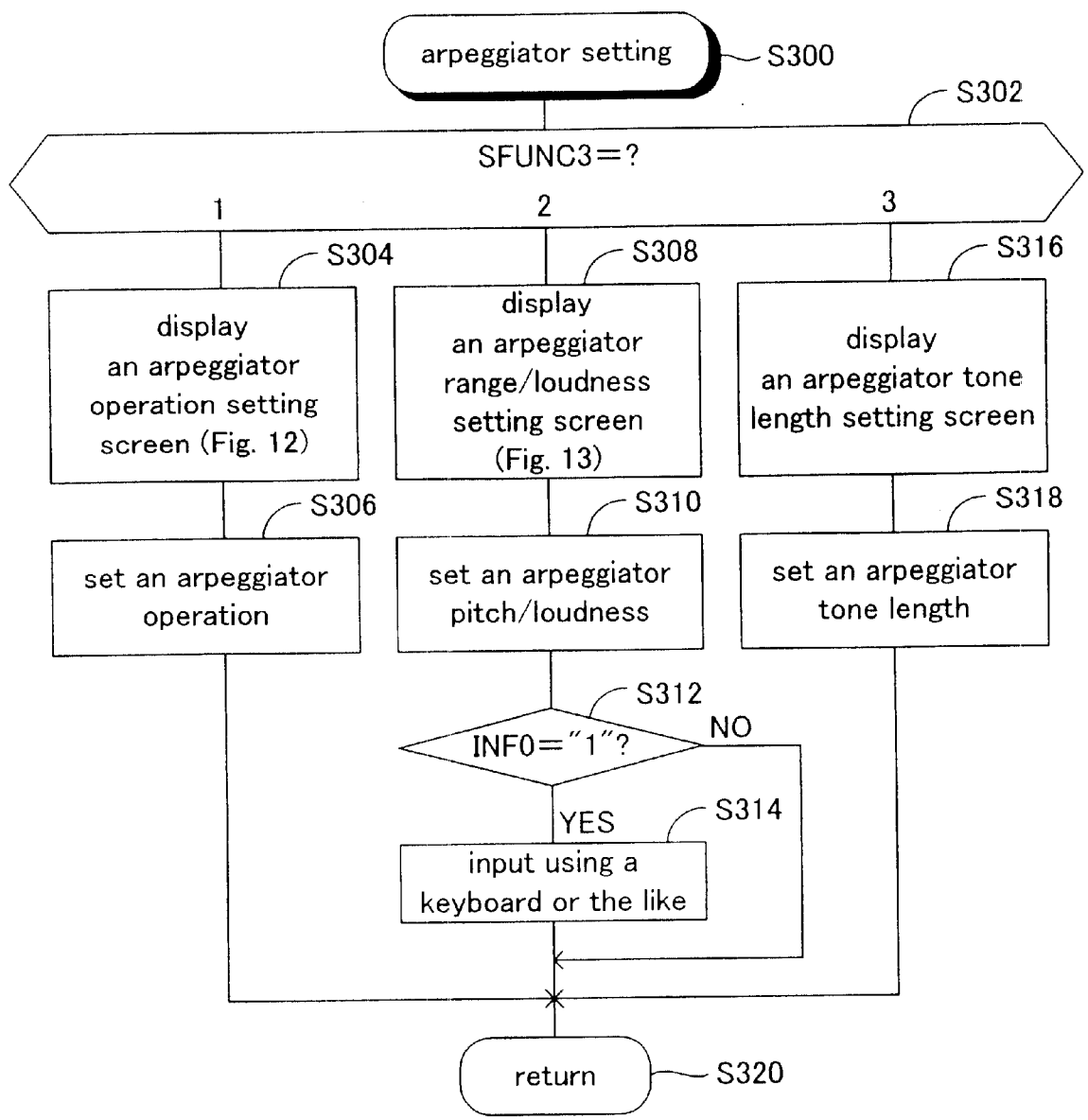
FIG. 6 is a flow chart showing an arpeggiator setting routine of FIG. 3 in detail.
Figure 12:
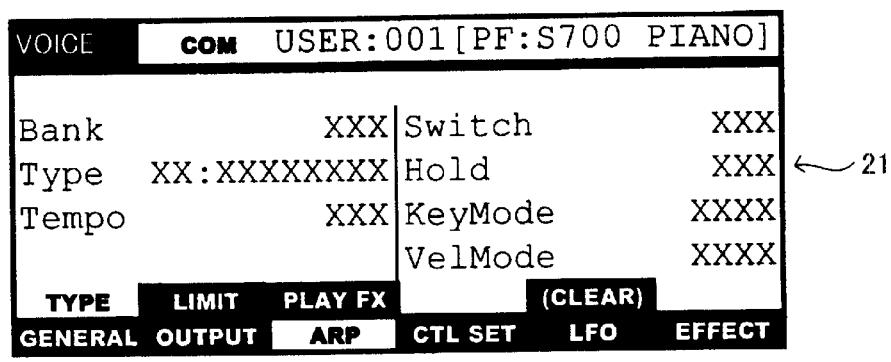
FIG. 12 is a view illustrating a display screen for setting an arpeggiator operation at the time of arpeggiator setting.

Further, the arpeggiator setting routine is started at step S300, as illustrated in detail in FIG. 6, and CPU 41 executes a branching process corresponding to the subfunction flag SFUNC3 in step S302. If the subfunction flag SFUNC3 is "1", the program is allowed to proceed to step S304 by the branching process of step S302. In step S304, by collaboration with display control circuit 27, CPU 41 displays on display 21 a screen for setting the operation of the arpeggiator. Referring to FIG. 12, this screen is for newly setting or changing a storing area (Bank) of the tone control parameters, an arpeggio pattern type, an arpeggio speed (Tempo), and others related to one type of tone signal (timbre of PF:S700 PIANO in the example of FIG. 12).

When the parameter setting operator group 25 is operated in this displaying state in the same manner as in the case of the aforesaid general item setting routine, the storing area, arpeggio pattern type, arpeggio speed, and others displayed on display 21 are newly set or changed by the arpeggiator operation setting process of step S306. Then, by operating the enter operator or the like, the tone control parameters representing the aforesaid storing area, arpeggio pattern type, arpeggio speed, and others are stored newly or stored in place of the previously stored tone control parameters.

Figure 13:
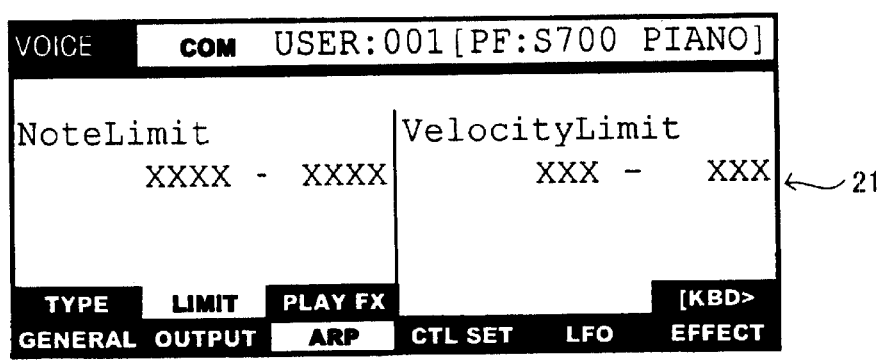
FIG. 13 is a view illustrating a display screen for setting a range and a loudness of an arpeggiator at the time of arpeggiator setting.

Further, if the subfunction flag SFUNC3 is "2", the program is allowed to proceed to steps S308, S310 by the branching process of step S302. In step S308, CPU 41 displays a screen for setting the range (Note Limit) and the loudness (Velocity Limit) of the arpeggiator on display 21, as illustrated in FIG. 13. In step S310, the tone control parameters representing the range and loudness of the arpeggio are stored newly or stored in place of the previously stored tone control parameters in accordance with an operation of the parameter setting operator group 25.

Further, in this case, if the information flag INFO is set to be "1", the process of determining as "YES" in step S312 leads to execution of a process for inputting an arpeggio range using the keyboard 10 in step S314. In this case, when the user moves the cursor to the arpeggio range displaying position to designate a pitch by keyboard 10, the pitch data representing the arpeggio range are set. Therefore, keyboard 10 can be used for setting the tone control parameters instead of the parameter setting operator group 25.

Further, if the subfunction flag SFUNC3 is "3", the program is allowed to proceed to step S316 by the branching process of step S302, and allows display 21 to display a screen for setting the tone length of the arpeggiator in step S316. Next, the tone control parameters related to the tone length of the arpeggiator are set or changed in accordance with an operation of the parameter setting operator group 25 by the process of step S318. Then, after the aforesaid processes of steps S306, S314 (or step S312), and S318, the execution of this arpeggiator setting routine is ended in step S320.

Further, during this arpeggiator setting process (the function flag FUNC is "3" at this moment), when the fifth subfunction operator 24e is operated while the subfunction flag SFUNC1 is "1", the data representing the operation of the arpeggiator are cleared. Thus, the tone control parameters that control the generation mode of the tone signals generated in the tone signal generator 50 are newly stored into the recording medium such as the hard disk in the program and data memory 43, or the tone control parameters stored in the recording medium are renewed.

As will be understood from the above description, in the electronic musical instrument according to the above embodiment, the functions belonging to the first hierarchy and the subfunctions belonging to the second hierarchy are respectively designated by an operation of the function operator group 23 and the subfunction operator group 24 that are arranged independently and in parallel near display 21. This eliminates the need for an operation to move from one hierarchy to another hierarchy, whereby the designation of a desired function and subfunction can be carried out easily, and a desired tone control parameter can be easily set to have a desired value or can be easily changed. Further, since the function operator group 23 and the subfunction operator group 24 are arranged along one side in the lateral direction, i.e. the longer side of the rectangular display 21, numerous function operators 23a to 23f, subfunction operators 24a to 24e, and information operator 24f can be advantageously arranged.

Further, in this electronic musical instrument, a function flag FUNC for designating the functions belonging to the first hierarchy is provided, and subfunction flags SFUNC1, SFUNC3 to SFUNC6 for designating the subfunctions belonging to the second hierarchy are provided for each function designated by the function flag FUNC. When any one operator in the function operator group 23 is operated, the function flag FUNC is renewed to a value representing the function designated by the operated function operator. On the other hand, when any one operator in the subfunction operator group 24 is operated, the subfunction flag belonging to the function designated by the function flag FUNC among the subfunction flags SFUNC1, SFUNC3 to SFUNC6 is renewed to a value representing the subfunction designated by the operated subfunction operator, and the values of the subfunction flags belonging to the functions that are not designated by the function flag FUNC are maintained at the previous values. Therefore, the operation of moving from a subfunction belonging to one function to a desired subfunction belonging to another function can be easily carried out, whereby a desired tone control parameter can be set more easily.

Here, in the above-described embodiment, various functions of the electronic musical instrument are designated by two hierarchies; however, the various functions may be designated by a more number of hierarchies. In this case as well, function operators may be arranged in plural rows equal in number to the hierarchies along one side of display 21, and each function may be designated hierarchy by hierarchy.

Also, in the above-described embodiment, description has been given on an example in which the present invention is applied to an electronic musical instrument having a keyboard as a play operator; however, the present invention can be applied to various musical instruments having a touch plate, a press button, a string, or the like as a play operator.

Further, in carrying out the present invention, it is not limited to the foregoing embodiments or variations thereof, but various modifications can be made as long as they do not depart from the object of the present invention.

What is claimed is:

1. A tone control parameter setting device comprising:

a displayer capable of displaying characters and numerals;

a plurality of first function operators arranged in one row near said displayer for respectively designating a different function;

a plurality of second function operators arranged in one row in parallel with said first function operators for respectively designating a different subfunction belonging to each of the functions designated by each of the first function operators;

a parameter setting operator for setting a tone control parameter that controls a mode of generating a tone signal;

a display controller for allowing said displayer to display a setting screen which corresponds to a subfunction designated by said second function operators among a plurality of subfunctions belonging to the function designated by said first function operators, wherein said setting screen is used for setting the tone control parameter that is designated by said subfunction to control the mode of generating the tone signal; and a parameter setting circuit for setting the tone control parameter, which is designated by the setting screen displayed on said displayer, in accordance with an operation of said parameter setting operator.

2. The tone control parameter setting device according to claim 1, wherein said display controller allows said displayer to display said tone control parameter, the functions that are allotted to said plurality of first function operators, and the subfunctions that are allotted to said plurality of second function operators, on said setting screen for setting said tone control parameter.

3. The tone control parameter setting device according to claim 2, wherein the functions and subfunctions are displayed in said setting screen at positions corresponding to said plurality of first and second function operators respectively.

4. The tone control parameter setting device according to claim 1, wherein the displayer has a rectangular shape with longitudinal and lateral lengths that are different from each other, and said plurality of first and second function operators are arranged along the longer side among the longitudinal and lateral sides.

5. The tone control parameter setting device according to claim 1, wherein said display controller comprises:

a variable storing memory for storing a first variable representing any one function among the plurality of functions designated by said plurality of first function operators and a plurality of second variables respectively representing any one subfunction among the plurality of subfunctions designated by said plurality of second function operators for each function designated by said first variable;

a first renewing circuit for renewing said first variable when any one of said plurality of first function operators is operated, to a value representing the function designated by said first function operator that is operated; and a second renewing circuit for renewing a second variable representing any one subfunction among the plurality of subfunctions belonging to the function designated by said first variable when any one of said plurality of second function operators is operated, to a value representing the subfunction designated by said second function operator that is operated, and said display controller allows said displayer to display a setting screen corresponding to the subfunction designated by said second variable among the plurality of subfunctions belonging to the function designated by said first variable.

6. A tone control parameter setting device comprising:

a displayer capable of displaying characters and numerals;

a plurality of first function operators arranged in one row near said displayer for respectively designating a different function;

a plurality of second function operators arranged in one row in parallel with said first function operators for respectively designating a different subfunction belonging to each of the functions designated by each of the first function operators;

a parameter setting operator for setting a tone control parameter that controls a mode of generating a tone signal; and a computer circuit for executing a computer program, wherein the computer program includes;

a first step for allowing said displayer to display a setting screen which corresponds to a subfunction designated by said second function operators among a plurality of subfunctions belonging to the function designated by said first function operators; and a second step for setting the tone control parameter, which is designated by the setting screen displayed on said displayer, in accordance with an operation of said parameter setting operator.

* * * * *